US006514600B1

(12) United States Patent
Dougherty et al.

(10) Patent No.: US 6,514,600 B1
(45) **Date of Patent: *Feb. 4, 2003**

(54) COLOR INKJET RECEPTIVE FILMS HAVING LONG TERM LIGHT STABILITY

(75) Inventors: James A. Dougherty, Kinnelon, NJ (US); John McKittrick, Jersey City, NJ (US)

(73) Assignee: ISP Investments Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 09/573,805

(22) Filed: May 18, 2000

(51) Int. Cl.[7] .................................................. B32B 3/00
(52) U.S. Cl. ........................................ 428/195; 428/500
(58) Field of Search ....................... 424/78.24; 428/195, 428/411.1, 474.4, 500; 526/264

(56) References Cited

U.S. PATENT DOCUMENTS

| | | | | | |
|---|---|---|---|---|---|
| 4,503,111 | A | | 3/1985 | Jaeger | |
| 5,139,868 | A | | 8/1992 | Mori | |
| 5,206,071 | A | | 4/1993 | Atherton | |
| 5,270,103 | A | | 12/1993 | Oliver | |
| 5,418,078 | A | | 5/1995 | Guido | |
| 5,494,759 | A | | 2/1996 | Williams | |
| 5,521,002 | A | | 5/1996 | Sneed | |
| 5,569,529 | A | | 10/1996 | Dieter | |
| 5,589,269 | A | | 12/1996 | Ali et al. | |
| 5,700,582 | A | | 12/1997 | Atherton | |
| 5,714,245 | A | | 2/1998 | Atherton | |
| 6,114,022 | A | * | 9/2000 | Warner et al. | 428/315.5 |
| 6,193,961 | B1 | * | 2/2001 | Liu et al. | 424/70.12 |
| 6,225,429 | B1 | * | 5/2001 | Chuang et al. | 526/264 |
| 6,369,180 | B1 | * | 4/2002 | Shish et al. | 526/264 |

FOREIGN PATENT DOCUMENTS

| | | |
|---|---|---|
| EP | 0650850 | 10/1994 |
| EP | 0696516 | 6/1995 |
| EP | 0709221 | 10/1995 |
| EP | 0716929 | 12/1995 |
| WO | WO92/07722 | 9/1991 |
| WO | WO 95/00340 | 1/1995 |
| WO | WO 96/18496 | 12/1995 |
| WO | WO 96/26841 | 1/1996 |
| WO | WO 97/20691 | 12/1996 |

OTHER PUBLICATIONS

*J. Imag. Sci V. 30,* No. 1, p. 4–9, Tektronix Feb. 1986, Development of transparent receiving sheet for ink jet, Titterington, Hue.

*J. Imag. Sci V. 42,* No. 1, p. 49, Feb. 1998, Progress and trends in ink–jet printing technology, Hue.

Luviskol®, Luvitec®, Luvicros® Versatile Speciatlty Polymers for Technical Applications, BASF (undated).

* cited by examiner

*Primary Examiner*—Bruce H. Hess
*Assistant Examiner*—Michael E. Grendzynski
(74) *Attorney, Agent, or Firm*—Walter Katz; William J. Davis; Marilyn J. Maue

(57) ABSTRACT

What is described herein is a clear white-appearance, water-resistant, color ink-receptive film having a copolymer of (a) vinyl caprolactam and (b) dimethylaminopropyl methacrylamide coated thereon; preferably the weight ratio of (a):(b) is 50-95:50-5; optimally about 80:20. The ink-receptive film of the invention is capable of being printed from a color inkjet printer to form color images thereon which exhibit excellent long-term color stability towards light. These advantageous results are achieved herein while retaining the desired properties of rapid ink dry time, good print quality, highly resolved circular dots, and high, uniform optical density, characteristic of other systems.

5 Claims, No Drawings

COLOR INKJET RECEPTIVE FILMS HAVING LONG TERM LIGHT STABILITY

BACKGROUND OF THE INVENTION

1. Field of the Invention

This invention relates to color inkjet recording films, and, more particularly, to color-receptive films coated with copolymers of vinyl caprolactam and dimethylaminopropyl methyl acrylamide having excellent color stability towards light.

2. Description of the Prior Art

The advent of color inkjet printing has been instrumental in fueling the print-on-demand revolution and has also created a number of challenges. Often, the surface of the desired media does not possess the necessary properties for accepting the inkjet ink. This results in long dry times and/or a poor ink-jet image. It has long been recognized that a surface treatment or media coating plays a critical role in the final print quality. Numerous media coatings are known in the art. They may contain any number of components and often consist of more than one layer. These ink-receptive coatings generally contain at least one hydrophilic polymer; often poly(vinylpyrrolidone) (PVP). PVP brings many benefits to properly formulated media coatings including rapid ink dry time, excellent print quality, highly resolved circular dots, and high, uniform optical density. Furthermore, copolymers of vinylpyrrolidone (VP) along with other suitable comonomers, such as dimethylaminoethyl methacrylate, acrylic acid, or vinyl acetate, have been used separately or in conjunction with PVP, to further optimize performance. Unfortunately, ink-jet images printed on VP-based formulations are prone to fading with exposure to light. Increasing demands for achievable ink-jet images has created a need for polymers with all the positive attributes of vinyl pyrrolidone and with improved light stability.

Accordingly, the object of the invention is to provide a clear, white-appearance, water-resistant, color inkjet-receptive film coated with a polymer which provides the color image thereon with excellent, long-term color stability.

SUMMARY OF THE INVENTION

What is described herein is a clear white-appearance, water-resistant, color ink-receptive film having a copolymer of (a) vinyl caprolactam and (b) dimethylaminopropyl methacrylamide coated thereon; preferably the weight ratio of (a):(b) is 50-95:50-5; optimally about 80:20. The ink-receptive film of the invention is capable of being printed from a color inkjet printer to form color images thereon which exhibit excellent long-term color stability towards light. These advantageous results are achieved herein while retaining the desired properties of rapid ink dry time, good print quality, highly resolved circular dots, and high, uniform optical density, characteristic of other systems.

DETAILED DESCRIPTION OF THE INVENTION

Test Methods

Coating formulations were prepared by dissolving the test copolymer in a suitable solvent at 10 wt.%. Drawdowns were cast on a polyester substrate using a #38 Mayer bar and allowed to dry overnight under ambient conditions to give a dry coating thickness of ~9 micron.

Coated samples were then printed using a selected printer. Individual blocks of cyan(C), magenta(M), yellow(Y), and black(K), approximately 1" X 1.75" in size, were printed side by side. Small blocks of C, M, Y, and K, approximately ⅛"×¼", are printed repeatedly down one edge of the page to provide a built-in time-line for measuring off-set time as described below.

Optical density (OD) was determined on blocks of cyan (C), magenta(M), yellow(Y), and black(K) using a Macbeth Densitometer. A large value for optical density is preferred.

Off-set time is the minimum time required for no ink to transfer to a cover sheet placed on top of the print when contacted with a 4-lb. Roller immediately after printing. Ink transfer is determined at the point where the OD after testing dropped by a value of 0.2 units. Fast off-set times are most desirable.

Light fastness is determined by measuring the change in optical density after 21 hours exposure to either a QUV or Atlas weatherometer. The results are given as a % change in optical density.

EXAMPLE 1

A 10 wt.% aqueous solution of a copolymer of vinyl caprolactam (VCL) and dimethylaminopropyl methacrylamide (DMAPMA) in the wt. ratio of VCL/DMAPMA of 80:20 was prepared according to the process described in U.S. Pat. No. 5,609,865 (ISP). A coating was cast from the solution onto a polyester film. After drying overnight, the test sample was printed using a HP 722C printer at 600 DPI in "HP Premium Photo Paper" mode. Off-set time and optical density values were determined as described above. Fading was determined after 21 hours exposure (37800 $KJ/M^2$) to an Atlas Suntest cps+.

A comparative test was run as above using STYLEZE® CC-10 (ISP), a vinyl pyrrolidone/dimethylaminopropyl methacrylamide copolymer.

The results of both tests, shown in Table 1 below establish that the VCL/DMAPMA copolymer exhibits superior and excellent long term light stability as compared to the VP-based copolymer.

TABLE 1

| Copolymer | Initial OD (C) | Initial OD (M) | Initial OD (Y) | % Delta OD (C) | % Delta OD (M) | % Delta OD (Y) | Offset Cyan (min) | Offset Mag. (min) | Offset Yel (min) |
|---|---|---|---|---|---|---|---|---|---|
| CC-10 | 1.37 | 2.26 | 1.91 | 31 | 59 | 61 | 0.0 | 0.1 | 0.1 |
| VCL/DMAPMA | 1.41 | 2.23 | 1.80 | 18 | 35 | 58 | 0.0 | 0.3 | 0.3 |

EXAMPLE 2

A coating was cast onto a polyester film from a 10 wt.% aqueous alcoholic solution of a 50:50 wt.% copolymer of VCL/DMAPMA. The sample was color-printed and the test properties were determined as in Example 1. The results are shown in Table 2 below.

TABLE 2

| Copolymer | Initial OD (C) | Initial OD (M) | Initial OD (Y) | % Delta OD (C) | % Delta OD (M) | % Delta OD (Y) | Onset Cyan (min) | Offset Mag. (min) | Offset Yel (min) | Offset Blk (min) |
|---|---|---|---|---|---|---|---|---|---|---|
| VP/DMAPMA | 1.47 | 2.27 | 1.57 | 31 | 56 | 68 | 0.0 | 0.2 | 0.3 | 0.8 |
| VCL/DMAPMA | 1.59 | 2.31 | 1.58 | 14 | 18 | 51 | 0.0 | 0.2 | 0.2 | 1.4 |

What is claimed is:

1. A color-ink receptive medium comprising a substrate with a coating thereon consisting essentially of a copolymer of (a) vinyl caprolactam (VCL) and (b) dimethylaminopropyl methacrylamide DMAPMA, in a weight ratio of (a):(b) of 50-95:50-5, which can be color-printed from a color ink-jet printer to form color images thereon exhibiting excellent long-term color stability towards light.

2. A color-ink receptive medium according to claim 1 wherein said weight ratio is about 80:20.

3. An ink-receptive film according to claim 1 wherein said copolymer is applied from a dilute aqueous or aqueous-alcoholic solution of the copolymer.

4. A color-ink receptive medium according to claim 1 wherein said substrate is polyester.

5. An ink-receptive film according to claim 1 which is color-printed from a color ink-jet printer to form color images thereon which exhibit excellent long-term color stability towards light.

* * * * *